Feb. 16, 1943. C. J. BURACZYNSKI 2,311,150
DIFFERENTIALLY BALANCED TORQUE TRANSMISSION
Filed Nov. 10, 1941 3 Sheets-Sheet 1
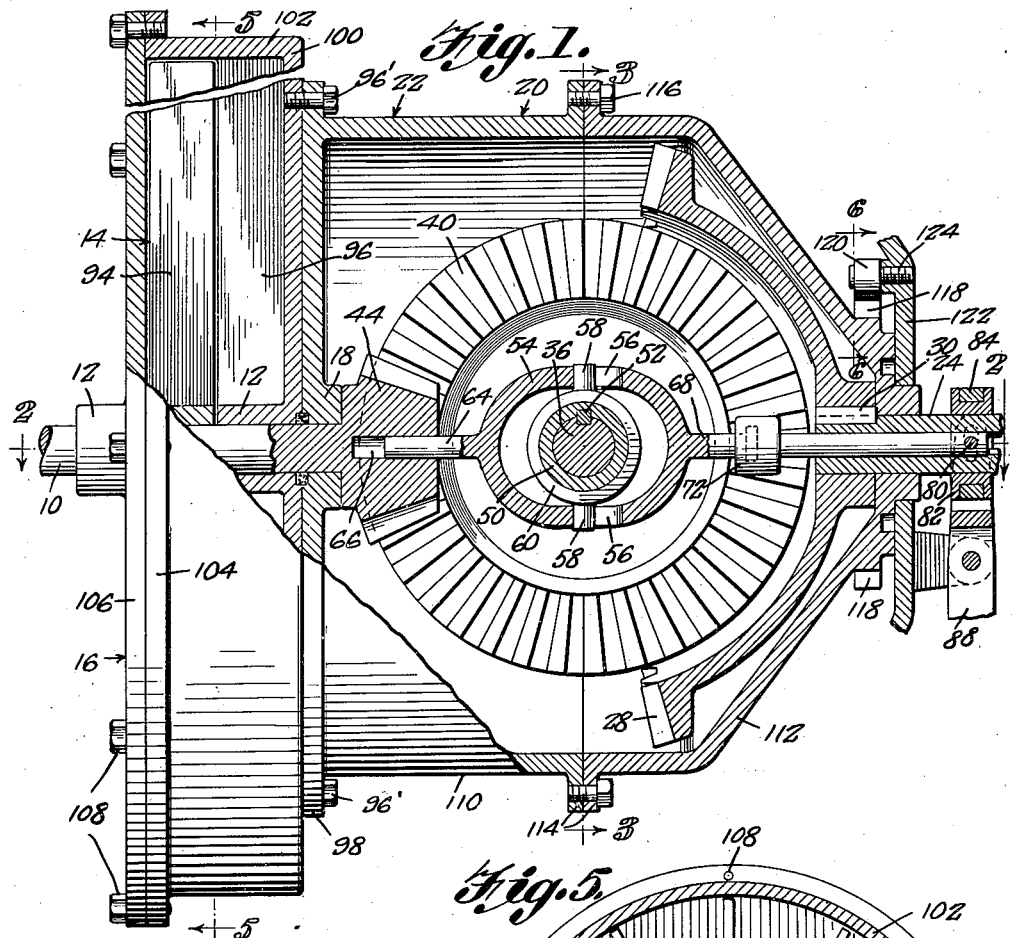
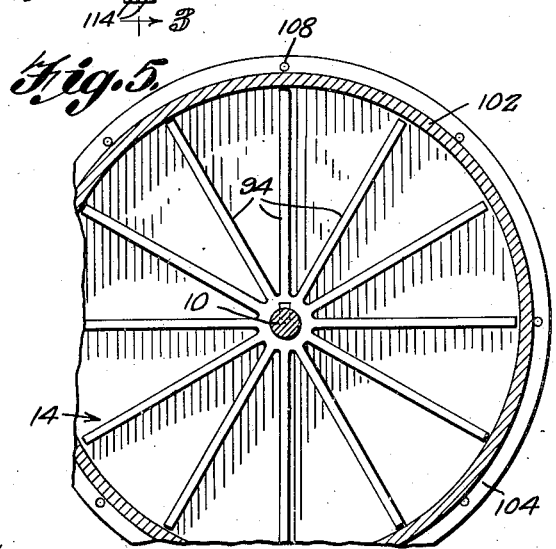
Casimer J. Buraczynski, INVENTOR
BY Victor J. Evans & Co.
ATTORNEYS

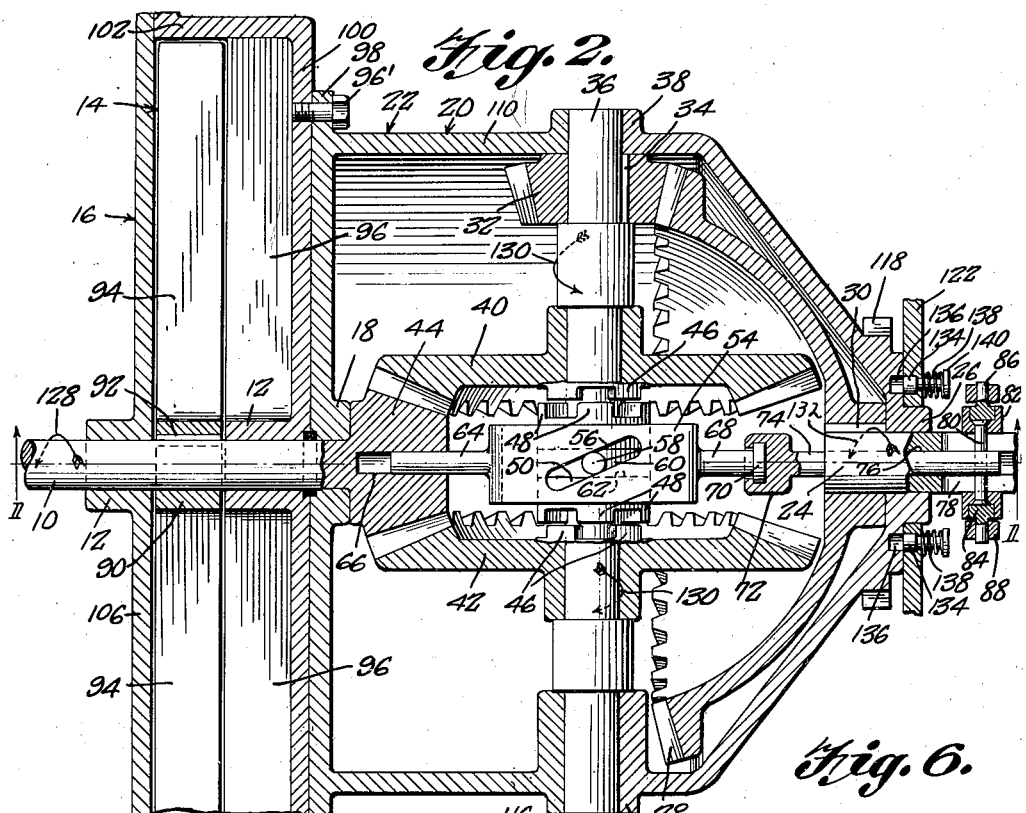
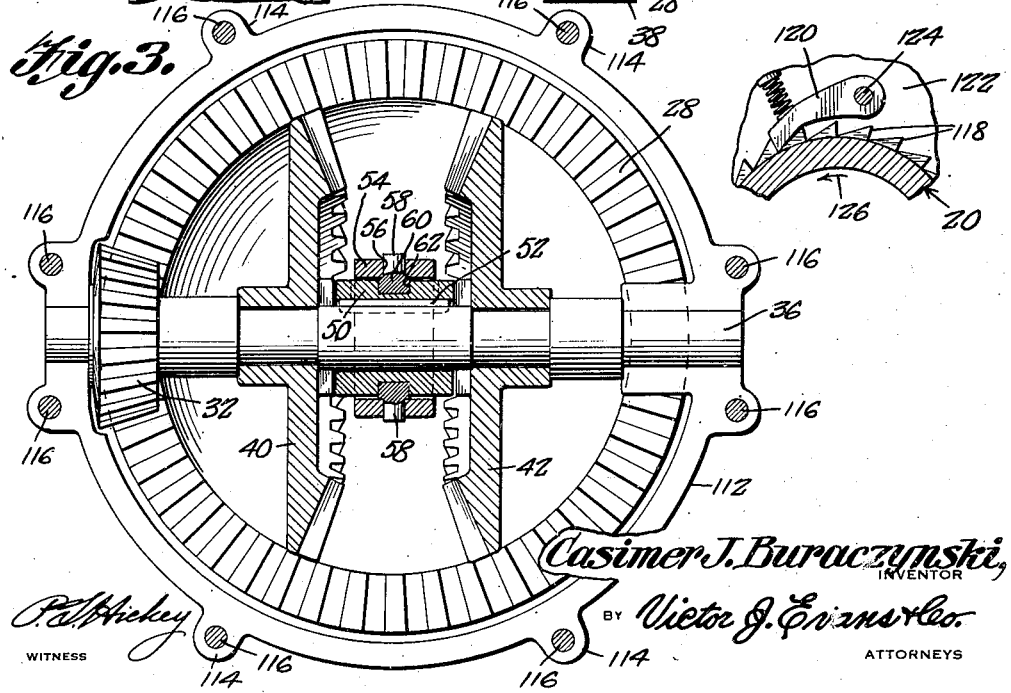

Patented Feb. 16, 1943

2,311,150

UNITED STATES PATENT OFFICE 2,311,150

DIFFERENTIALLY BALANCED TORQUE TRANSMISSION

Casimer J. Buraczynski, Milwaukee, Wis.

Application November 10, 1941, Serial No. 418,559

12 Claims. (Cl. 74—189.5)

The present invention relates to the transmission of motion, as between a driver and a driven means, and has among its objects and advantages the provision of an improved differentially balanced torque transmission.

In the accompanying drawings:

Figure 1 is a sectional view taken substantially along the line 1—1 of Figure 2, with certain shafts illustrated in elevation;

Figure 2 is a sectional view taken substantially along the line 2—2 of Figure 1, with certain parts illustrated in elevation;

Figure 3 is a sectional view taken along the line 3—3 of Figure 1;

Figure 4 is a sectional detail view of a portion of a drag unit;

Figure 5 is a sectional view along the line 5—5 of Figure 1;

Figure 6 is a sectional detail view taken along the line 6—6 of Figure 1;

Figures 7, 8:
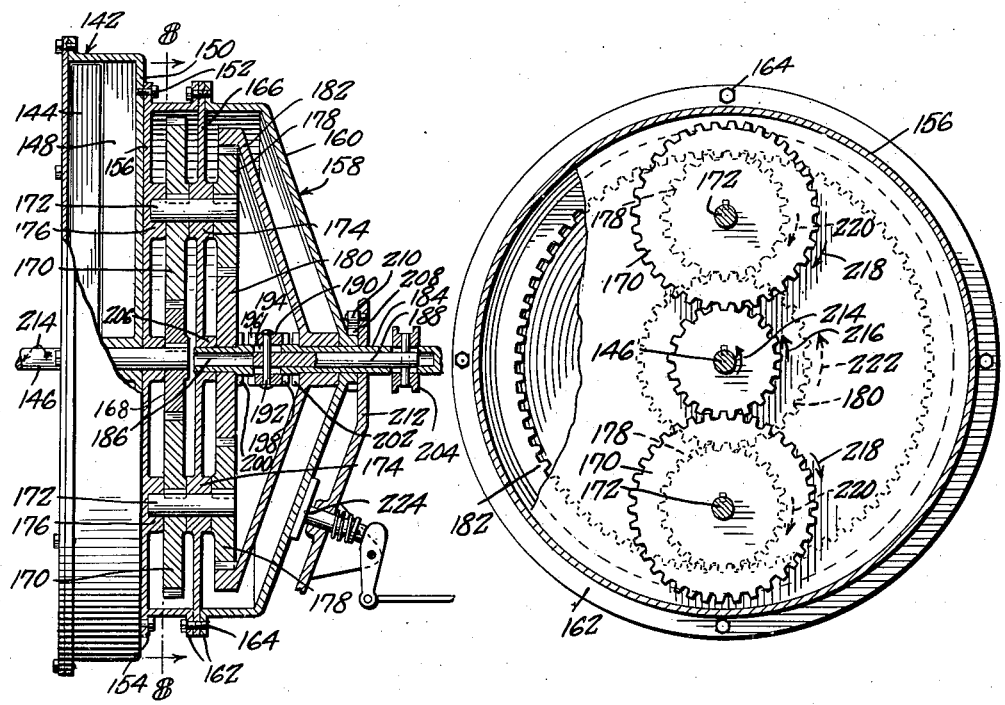
Figure 7 is a fragmentary view of another form of the invention.
Figure 8 is a view taken along the line 8—8 of Figure 7.

In the embodiment selected to illustrate the invention, the drive shaft 10 extends loosely through bearings 12 on the housing 14 of a drag unit 16 as well as through a bearing 18 in the housing 20 of a differential unit 22. Arranged axially of the drive shaft 10 is a driven shaft 24 extending loosely through a bearing 26 on the housing 20. To the inner end of the shaft 24 is fixedly secured a large bevel gear 28, as by a key 30, and the gear is in mesh with a bevel gear 32 keyed at 34 to a shaft 36 rotatably carried in bearings 38 on the transmission housing 20. Shaft 36 is positioned at right angles to the common axis of the drive shaft 10 and the driven shaft 24.

Two idling bevel gears 40 and 42 are mounted on the shaft 36, which gears are in mesh with a bevel gear 44 keyed to the drive shaft 10. Gear 44, which connects directly with the drive shaft 10, is of relatively small diameter with respect to the bevel gears 40 and 42, while the bevel gear 32, which drives the bevel gear 28, is of relatively small diameter with respect to the gear 28. Accordingly, the gear train is in the nature of a speed reducer so as to develop a powerful torque effective on the driven shaft 24.

In Figs. 2 and 3, each of the gears 40 and 42 is provided with clutch dogs 46 arranged to be selectively engaged by the clutch dogs 48 on a clutch collar 50 mounted on the shaft 36 between the gears 40 and 42. While the clutch collar 50 may be shifted axially on the shaft 36, the collar is keyed against relative rotation, as at 52 in Fig. 3. About the clutch collar 50 is positioned an actuating collar 54 which fits loosely on the clutch collar and is provided with diametrically opposed angular slots 56 for the reception of pins 58 projecting radially from a supporting ring 60 fitting loosely in a groove 62 extending circumferentially about the clutch collar 50. Fig. 1 illustrates the actuating collar 54 as being elongated so as to permit shifting relatively to the clutch collar 50 when moved axially of the drive shaft 10 or the driven shaft 24.

To the actuating collar 54 is fixedly connected a pin 64 which is movable axially in a bore 66 in the gear 44 and located axially of the drive shaft 10. A pin 68 is also secured to the actuating collar 54 diametrically opposite the pin 64 and is provided with a flange 70 loosely connected with a head 72 on a shaft 74 which slides freely in a bore 76 in the shaft 24, the bore being located axially of the shaft. Flange 70 is rotatable relatively to the head 72 and the pin 64 and the shaft 74 may be moved axially to shift the clutch collar 50 axially of the shaft 36 in either direction, depending upon the direction of movement imparted to the shaft 74. Inward movement of the shaft 74, as when viewing Fig. 2, shifts the clutch collar 50 to bring its clutch dogs 48 into engagement with the clutch dogs 46 on the gear 42. Similarly, an outward pull on the shaft 74 shifts the clutch collar 50 in the opposite direction to bring its clutch dogs 48 on its opposite end into engagement with the clutch dogs 46 on the gear 40. Figs. 2 and 3 illustrate the clutch collar 50 in its neutral position, at which time both sets of clutch dogs 48 are completely disengaged from their respective clutch dogs 46 on the gears 40 and 42.

In Fig. 2, the driven shaft 24 is provided with slots 78 through which a pin 80 projects, which pin is fixedly secured to the shaft 74. The ends of the pin are riveted to a collar 82 grooved for the reception of a ring 84 having pins 86 connected with an outside collar 88 through the medium of which the collar 82 may be shifted longitudinally on the shaft 24 to impart endwise motion to the shaft 74, the latter and the collar 82 rotating with the driven shaft 24.

To the drive shaft 10 is keyed a hub 90, as at 92, which hub is provided with a series of radial vanes 94 located inside the housing 14. A similar series of vanes 96 is attached to the housing 14. The housing 14 constitutes a fluid container and both sets of vanes are located inside the housing.

For convenience in manufacture, the housing 14 is formed as a separate unit from the housing 20, but the two housings are fixedly connected as a unit through the medium of bolts 96' which extend through bores in a flange 98 on the housing 20 and are threaded into the wall 100 of the housing 14. Wall 100 is formed integrally with a peripheral wall 102 flanged at 104, as in Fig. 1, to which flange is secured a closure plate or cover 106 through the medium of bolts 108 extending through bores in the cover and threaded into the flange 104. Housing 20 is also formed in sections 110 and 112 joined in a plane corresponding to the axis of the shaft 36, see Fig. 1. Flanges 114 on the sections 110 and 112 are fixedly clamped together by bolts 116.

Figs. 1, 2 and 3 illustrate the section 112 of the housing 20 as being provided with ratchet teeth 118 for coaction with a pawl 120 pivotally mounted on a member 122 through the medium of a bolt 124. Member 122 may constitute a housing for enclosing the drag unit 16 and the differential unit 22 and relatively fixed with respect to the drag and differential units. According to Fig. 6, the pawl 120 permits rotation of the housing 20 in the direction of the arrow 126 but restrains the housing from rotation in the opposite direction.

In operation, rotation of the drive shaft 10, as in the direction of the arrow 128 in Fig. 2, rotates the gear 42 in the direction of the arrow 130 and the gear 40 in the opposite direction. No rotation is imparted to the shaft 36 so long as the clutch collar 50 is in the neutral position of Figs. 2 and 3. Clutching engagement between the clutch dogs 48 adjacent the gear 42 and the clutch dogs 46 of that gear fixedly relates the gear to the shaft 36, so that the latter and the gear 32 will rotate in the same direction as the gear 42. Thus the gear 28, which is fixedly connected with the driven shaft 24, will be rotated in the direction of the arrow 132 illustrated about the driven shaft.

The motions of the different parts of the transmission are determined by the gear ratios of the differential unit 22 and the conditions of power applied and load carried, except that the drag unit 16 and the differential unit 22 are restrained from rotation in a negative direction, that is, opposite to the direction of the drive shaft 10 because of the ratchet teeth 118 and the pawl 120. When power is applied to the drive shaft 10, the natural tendency of the gear 32 is to roll about the gear 28 and turn the drag unit 16 and the differential unit 22 in the negative direction when the load effective on the driven shaft 24 is greater than the force of the drag between the vanes 94, which are fixedly connected with the drive shaft 10, and the vanes 96, which are fixedly connected with the drag unit 16 and the differential unit 22, so far as rotary motion is concerned. Such negative rotation is entirely prevented by reason of the ratchet feature.

With power applied to the drive shaft 10 against a given load effective on the driven shaft 24, the torque effective on the driven shaft is equal to the total gear ratio of the differential unit minus the power lost by the drag of the vanes 94 rotated by the drive shaft 10; that is, at the drive shaft 10 there is a power loss through the drag of its vanes through the liquid, but the remaining power is transmitted through a gear ratio (remembering that the drag unit 16 and the differential unit 22 are stationary for the moment) high enough to overcome the load and also impart acceleration to the driven shaft.

Since the initial load is composed of inertia and friction, and as the inertial part of the load is reduced by acceleration, the turning effort of the drag unit 16 and the differential unit 22 in a negative direction is reduced to the same extent, thus permitting the vanes 94 on the drive shaft 10 to turn the vanes 96 proportionately in the positive direction, thereby reducing power loss to the extent that the drag between the two sets of vanes is reduced. Also the mechanical advantage is reduced because only a part of the available power is transmitted through the gears, the other part being direct. As the load is further reduced by acceleration and becomes constant, the effort of the drag unit 16 and the differential unit 22 to turn in the negative direction is overcome or balanced by the drag of the vanes 94 on the drive shaft 10, so that the drive shaft 10, the driven shaft 24, the drag unit 16 and the differential unit 22 revolve at the same rate and in the same direction, and the torque effective on the driven shaft 24 is equal to the torque at the drive shaft 10. Under such conditions, the transmission is in high gear.

When the driven shaft 24 is loaded to the point where it counteracts the tendency of the liquid to impart rotary motion to the vanes 96, the tendency of the drag unit 16 and the differential unit 22 to turn in a negative direction is prevented by reason of the pawl 120 and the ratchet teeth 118. Thus the driven shaft 24 is rotated at reduced speed and with increased power. In other words, the device is then in low gear. Between high gear and low gear, the device functions to provide all intermediate gear conditions in response to variable load conditions on the driven shaft 24. All the gear adjustments are secured automatically in response to different load conditions. The gear ratio of the differential unit, in conjunction with the ratchet feature, is such, allowing for power loss in the drag unit, as to take up and sustain its load immediately upon the application of power. Without the ratchet, a torque would first have to be built up before the transmission could take up the load.

Reversal of the transmission device is accomplished through adjustment of the clutch collar 50 to bring its clutch dogs 48 adjacent the gear 40 into clutching engagement with the clutch dogs 46 on that gear. For reversing purposes, the drag unit 16 and the differential unit 22 are latched against rotation. Fig. 2 illustrates the member 122 as being provided with axially slidable pins 134 which are adapted to be pressed into openings 136 in the section 112 of the differential housing 20 to restrain the housing from rotation. Compression springs 138 are interposed between the member 122 and the heads 140 of the pins to normally hold the latter in the retracted positions of Fig. 2. When the actuating collar 54 is shifted for reversing purposes, the collar 88 is brought into engagement with the pins 134 for pressing the latter into the openings 136 to prevent planetary motion when the device is in reversing position. The transmission device is of relatively simple construction and incorporates relatively few parts. Forward and reverse motions are secured through the medium of only five gears arranged in a compact unit. More important, the transmission operates to take up and sustain its load immediately upon the application of power.

Figs. 7 and 8 illustrate the invention in which spur gears are used in lieu of bevel gears. The drag unit 142 encloses vanes 144 keyed to the drive shaft 146. The vanes 148 are fixedly related to the housing section 150, and the latter is bolted at 152 to the flange 154 on the housing section 156 of the differential unit 158. Section 156 and its companion section 160 of the differential unit are flanged at 162 and bolted into a unitary structure, as at 164. Between the flanges 162 and fixedly secured therebetween by the bolts 164 is a plate 166.

To the inner end of the drive shaft 146 is keyed a spur gear 168, which gear is in mesh with larger spur gears 170 keyed to shafts 172 rotatably supported in bearings 174 on the plate 166. Bearings 176 are also attached to the section 156 to afford additional support for the shafts 172. To each of the shafts 172 is keyed a spur gear 178, and each spur gear meshes with a larger spur gear 180. The shafts 172 parallel the drive shaft 146 and are located 180° apart with respect to the axis of the drive shaft. Both gears 178 are of smaller diameter than their respective gears 170. Gear 180 is axially aligned with the drive shaft 146, the three gears 168 and 170 are mounted closely adjacent one side of the plate 166, and the three gears 178 and 180 are mounted closely adjacent the opposite side of the plate. Both gears 178 mesh with an internal gear 182 mounted loosely on the driven shaft 184, which shaft is aligned axially with the drive shaft 146.

Within the bore 186 in the driven shaft 184 is slidably positioned a clutch shaft 188 having a clutch collar 190 keyed thereto by a pin 192 extending through slots 194 in the driven shaft 184. Slots 194 are of such length as to permit adjustment of the clutch collar 190 longitudinally of the driven shaft 184, and the collar is provided with clutch dogs 196 and 198. Upon the adjacent face of the spur gear 180 is secured clutch dogs 200 adapted to be engaged by the clutch dogs 196 when the clutch collar 190 is advanced in the direction of the spur gear. Similar clutch dogs 202 are attached to the gear 182 to be engaged by the dogs 198 when the clutch collar 190 is advanced in the direction of the gear. Longitudinal adjustment of the clutch shaft 188 is accomplished through the medium of a collar 204 such as that disclosed in Fig. 2. The inner end of the driven shaft 184 extends loosely through an opening in the gear 180 and is supported by a bearing 206.

Ratchet teeth 208 are provided on the section 160 of the differential unit, and a pawl 210 is mounted on the member 212, which may comprise a housing, for engagement with the ratchet teeth 208 to restrain the drag unit 142 and the differential unit 158 from negative rotation.

Rotation of the drive shaft 146 in the direction of the arrow 214 rotates the gear 168 in the same direction, as indicated by the arrow 216 of Fig. 8, so that the gears 170 are rotated clockwise, as indicated by the arrows 218. Since the gears 178 are keyed to the shafts 172, the former are rotated in the direction of the arrows 220, which in turn rotates the gear 180 in the direction of the arrow 222. With the clutch dogs 196 engaging the clutch dogs 200 on the spur gear 180, the driven shaft 184 will rotate in the same direction as the drive shaft 146.

With a load on the driven shaft 184 and the shaft connected with the gear 180, the natural tendency of the drag unit 142 and the differential unit 158 is to rotate in a negative direction, that is oppositely the driven shaft 184. In the absence of the pawl and ratchet feature, the gears 178 would merely roll on the gear 180 which would impart clockwise rotation to the transmission structure, when viewed according to Fig. 8. Thus the pawl and ratchet feature effectively restrains the device from such negative rotation so that the transmission structure of Figs. 7 and 8 will operate in the same manner as the device illustrated in Figs. 1 through 6.

To reverse, the clutch dogs 198 are moved into engagement with the clutch dogs 200 to fixedly relate the gear 182 with the driven shaft 184. Fig. 7 illustrates the clutch collar 190 in its neutral position, at which time both the clutch dogs 200 and 202 are completely disconnected from the clutch collar. When the gear 182 is fixedly clutched to the driven shaft 184 for reversing purposes, the drag unit 142 and the differential unit 158 are fixed against rotation through the medium of a clutch 224.

Having thus described certain embodiments of my invention in detail, it is, of course, understood that I do not desire to limit the scope thereof to the exact details set forth except insofar as those details may be defined in the appended claims.

I claim:

1. In a power transmission mechanism, the combination of a drive member and a driven member, differential gearing operatively connecting the drive member with the driven member, a rotary support for the differential gearing including a fluid chamber, fluid transmission means inside said chamber fixedly related to said support, fluid transmission means inside said chamber fixedly secured to said drive member to rotate therewith relatively to said first-mentioned fluid transmission means, means acting on said support to restrain the latter from negative rotation but permitting rotation in the same direction, a reversing gear, and means operatively connecting and disconnecting said reversing gear into and out of said differential gearing.

2. In a power transmission mechanism, the combination of a drive member and a driven member, differential gearing operatively connecting the drive member with the driven member, a rotary support for the differential gearing including a fluid chamber, vanes inside said chamber fixedly secured to said support, vanes inside said chamber fixedly secured to said drive member to rotate therewith relatively to said first-mentioned vanes, means acting on said support to restrain the latter from rotation reversely of said drive member but permitting rotation in the same direction, a reversing gear, and means operatively connecting and disconnecting the reversing gear into and out of said differential gearing.

3. In a power transmission mechanism, the combination of a drive member and a driven member, differential gearing operatively connecting the drive member with the driven member, a rotary support for the differential gearing including a fluid chamber, fluid transmission means inside said chamber fixedly related to said support, fluid transmission means inside said chamber fixedly secured to said drive member to rotate therewith relatively to said first-mentioned fluid transmission means, a reversing gear, means operatively connecting and disconnecting the reversing gear into and out of said differential gearing, a member relatively stationary with respect to said support, and a ratchet mechanism acting on said stationary member and said support to restrain the latter from rotation reversely of said drive member but permitting rotation in the same direction.

4. In a power transmission mechanism, the combination of a drive member and a driven member, differential gearing operatively connecting the drive member with the driven member, a rotary support for the differential gearing including a fluid chamber, vanes inside said chamber fixedly secured to said support, vanes inside said chamber fixedly secured to said drive member to rotate therewith relatively to said first-mentioned vanes, a reversing gear, means operatively connecting and disconnecting said reversing gear into and out of said differential gearing, a member relatively stationary with respect to said support, and a ratchet mechanism acting on said stationary member and said support to restrain the latter from rotation reversely of said drive member but permitting rotation in the same direction.

5. The combination of a rotary gear housing having a shaft rotatably journaled therein and including a fluid chamber, a drive member having a first gear fixed thereto, a forward gear and a reverse gear loosely mounted on said shaft and meshing with said first gear for relative rotation in opposite directions, a third gear keyed to said shaft, a driven gear keyed to said driven member and meshing with said third gear, clutch parts respectively fixed to said forward and reverse gears, a clutch member keyed to said shaft but movable longitudinally thereon, a clutch member actuating means for selectively shifting the clutch member into and out of engagement with either of said clutch parts, vanes inside said fluid chamber fixed to the gear housing for rotation therewith, vanes inside said chamber fixed to said drive member for rotation therewith relatively to said first-mentioned vanes, and means acting on said gear housing to restrain the latter from rotation reversely of said drive member but permitting rotation in the same direction.

6. The combination of a rotary gear housing having a shaft rotatably journaled therein and including a fluid chamber, a drive member having a first gear fixed thereto, a forward gear and a reverse gear loosely mounted on said shaft and meshing with said first gear for relative rotation in opposite directions, a third gear keyed to said shaft, a driven gear keyed to said driven member and meshing with said third gear, clutch parts respectively fixed to said forward and reverse gears, a clutch member keyed to said shaft but movable longitudinally thereon, a clutch member actuating means for selectively shifting the clutch member into and out of engagement with either of said clutch parts, vanes inside said fluid chamber fixed to the gear housing for rotation therewith, vanes inside said chamber fixed to said drive member for rotation therewith relatively to said first-mentioned vanes, means acting on said gear housing to restrain the latter from rotation reversely of said drive member when said clutch member is in driving engagement with the clutch part of said forward gear but permitting rotation in the same direction, and means restraining said gear housing from rotation when said clutch member is moved into clutching engagement with said reverse gear.

7. The invention described in claim 5 wherein said forward gear and reverse gear are of larger diameter than said first gear, said third gear of smaller diameter than the forward and reverse gears and said driven gear of larger diameter than the forward and reverse gears.

8. The invention described in claim 5 wherein all said gears are of the bevel type.

9. The invention described in claim 5 wherein said first gear is provided with an axial bore, said driven member having a hollow extent, a pin on said clutch member slidable in said bore and supported by the pinion, and an actuating shaft fixed to said clutch member and slidable inside the hollow driven member.

10. The combination of a rotary gear housing having a drive member rotatably journaled therein and including a fluid chamber, a first gear keyed to said drive member, a support inside said housing fixed thereto, a pair of shafts rotatably journaled in said support, second and third gears respectively keyed to said shafts and meshing with said first gear, a fourth gear having a clutch part, fifth and sixth gears respectively keyed to said shafts and meshing with said fourth gear, a seventh gear meshing with said fifth and sixth gears and having a clutch part, a driven member loosely related to said fourth and seventh gears, a clutch member adapted to be moved into selective engagement with either of said clutch parts, means acting on said gear housing to restrain the latter from rotation reversely of said drive member but permitting rotation in the same direction, vanes in said fluid chamber fixed to the gear housing for rotation therewith, and vanes inside said fluid chamber fixed to said drive member and movable relatively to said first-mentioned vanes.

11. The invention described in claim 10 wherein said first through sixth gears being of the spur type and said seventh gear being of the internal ring type.

12. The invention described in claim 10 wherein means are provided for restraining said gear housing from rotation when said clutch member is moved into engagement with the clutch part on said seventh gear.

CASIMER J. BURACZYNSKI.